(12) United States Patent
Almaraz et al.

(10) Patent No.: US 6,851,503 B2
(45) Date of Patent: Feb. 8, 2005

(54) SEAT BELT TENSION SENSOR ASSEMBLY

(75) Inventors: Jose L Almaraz, Chihuahua (MX); Samuel Roland Palfenier, El Paso, TX (US); Arquimedes Godoy, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 94 days.

(21) Appl. No.: 10/373,172

(22) Filed: Feb. 24, 2003

(65) Prior Publication Data
US 2004/0060761 A1 Apr. 1, 2004

Related U.S. Application Data
(60) Provisional application No. 60/415,294, filed on Oct. 1, 2002.

(51) Int. Cl.[7] .............................................. B60R 22/48
(52) U.S. Cl. ................... 180/268; 24/641; 73/862.393; 73/862.69; 340/457.1
(58) Field of Search .................. 180/268; 280/735, 280/801.1; 73/862.393, 862.392, 862.391, 862.69; 24/633, 641; 340/457.1

(56) References Cited
U.S. PATENT DOCUMENTS

| 5,060,977 | A | 10/1991 | Saito |
| 5,823,627 | A | 10/1998 | Viano et al. |
| 6,081,759 | A | 6/2000 | Husby et al. |
| 6,502,860 | B1 | 1/2003 | Siegfried et al. |
| 6,554,318 | B2 | 4/2003 | Kohut et al. |
| 6,605,877 | B1 | 8/2003 | Patterson et al. |
| 6,679,524 | B2 * | 1/2004 | Greib et al. ................ 180/268 |
| 6,729,194 | B2 * | 5/2004 | Kaijala et al. ......... 73/862.391 |
| 2003/0150283 | A1 * | 8/2003 | Stanley et al. ......... 73/862.391 |
| 2003/0226409 | A1 * | 12/2003 | Steele et al. ........... 73/862.391 |

* cited by examiner

*Primary Examiner*—Peter C. English
(74) *Attorney, Agent, or Firm*—Jimmy L. Funke

(57) ABSTRACT

A seat belt tension sensor assembly includes a housing, a slider slidably received within the housing, wherein the slider is configured for movement between a first position and a second position within the housing, and a first and second magnet associated with the slider for slidable movement therewith. The first and the second magnets are positioned side by side with opposite polarization. A hall effect device is fixed relative to the housing and protrudes between the first and the second magnets when the slider is in the second position. The hall effect device is configured to produce an output signal, the output signal being indicative of a seat belt tension of a seat belt as applied to the sensor assembly. A biasing member provides an urging force to the slider, the urging force urging the slider into the first position.

15 Claims, 5 Drawing Sheets

SEAT BELT TENSION SENSOR ASSEMBLY

RELATED APPLICATIONS

This application claims the benefit of U.S. provisional application No. 60/415,294 filed Oct. 1, 2002 entitled "SEAT BELT TENSION SENSOR ASSEMBLY," hereby incorporated by reference.

TECHNICAL FIELD

The present invention relates generally to a safety restraint system, and more particularly to a seat belt tension sensor assembly that can detect the tension and engagement of a seat belt and provide an electrical signal in response thereto.

DISCUSSION OF THE BACKGROUND ART

Vehicles are provided with seat restraints systems such as a seat belts in order to restrain occupants in the seat. The proper engagement and operation of the seat belt is critical to the safety of a driver and his or her occupants.

Seat belts often incorporate sensors that provide data to other vehicle restraint vehicle systems such as airbags. Deployment of an airbag may partially depend on the information supplied by the sensor in the seat belt, such as a sensor may determine the weight of an object in the seat. There are, however, several problems with detecting seat occupant weight. For example, when a seat occupant puts on the seat belt, the force of cinching the seat belt across ones' lap can cause a seat weight sensor to have false and inaccurate readings. Another example is when a child's safety seat is cinched tightly in the car seat, it can appear to the sensor that a heavy person is in the seat, which is the wrong reading required for the proper operation of the restraint system. A small passenger, such as a child should cause small tension, therefore the airbag system should deactivate.

A tension sensor with the ability of sensing the tension in the belt system can be used to more accurately differentiate the size of the vehicle occupant. Additionally, a tension sensor can also be used to indicate that the seat belt is properly tightened and properly engaged or latched.

International Publication No. WO 02/06092 A1 discloses a seat belt tension sensor assembly, which includes a housing, a pair of magnets, and a Hall effect sensor all arranged to be coupled to an "anchor side" of a seat belt system (not the "buckle" side). The arrangement of the magnets relative to the sensor is not as integrated into the overall seat belt assembly as desired. In addition, the pair of magnets are oriented face to face wherein the direction of magnetization is in the same axis for both magnets, not in an opposite orientation. It is believed that this arrangement limits the useful tension resolving capabilities of the device.

Accordingly, there is a need for a seat belt tension sensor assembly that minimizes of eliminates one or more of the problems set forth above.

SUMMARY OF THE INVENTION

It is an object of the present invention to minimize or eliminate one or more of the problems set forth in the Background. One advantage of the present invention is that allows a higher level of integration of the tension sensor assembly into the seat belt system. According to the invention, a seat belt tension sensor assembly comprises a housing, a slider slidably received within the housing, the slider being configured for movement between a first position and a second position within the housing, a first and second magnet associated with the slider for slidable movement therewith, the first and said second magnets being positioned side by side with opposite polarization, a Hall effect device being fixed relative to the housing and protruding between the first and the second magnets when the slider is in the second position, the Hall effect device being configured to produce an output signal, the output signal being indicative of a seat belt tension of a seat belt as applied to the sensor assembly, and a biasing member for providing an urging force to the slider, the urging force urging the slider into the first position. In addition, the opposite orientation of the pair of magnets increases the magnetic field intensity thereby improving detection, and the accompanying signal-to-noise ratio. Moreover, the arrangement allows better use of the travel distance of the slider (i.e., the useful range over which tension sensing can occur).

The invention allows detection of a tension force in the seat belt.

In another aspect, a second sensor is provided to detect when the seat belt has been engaged.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 1:
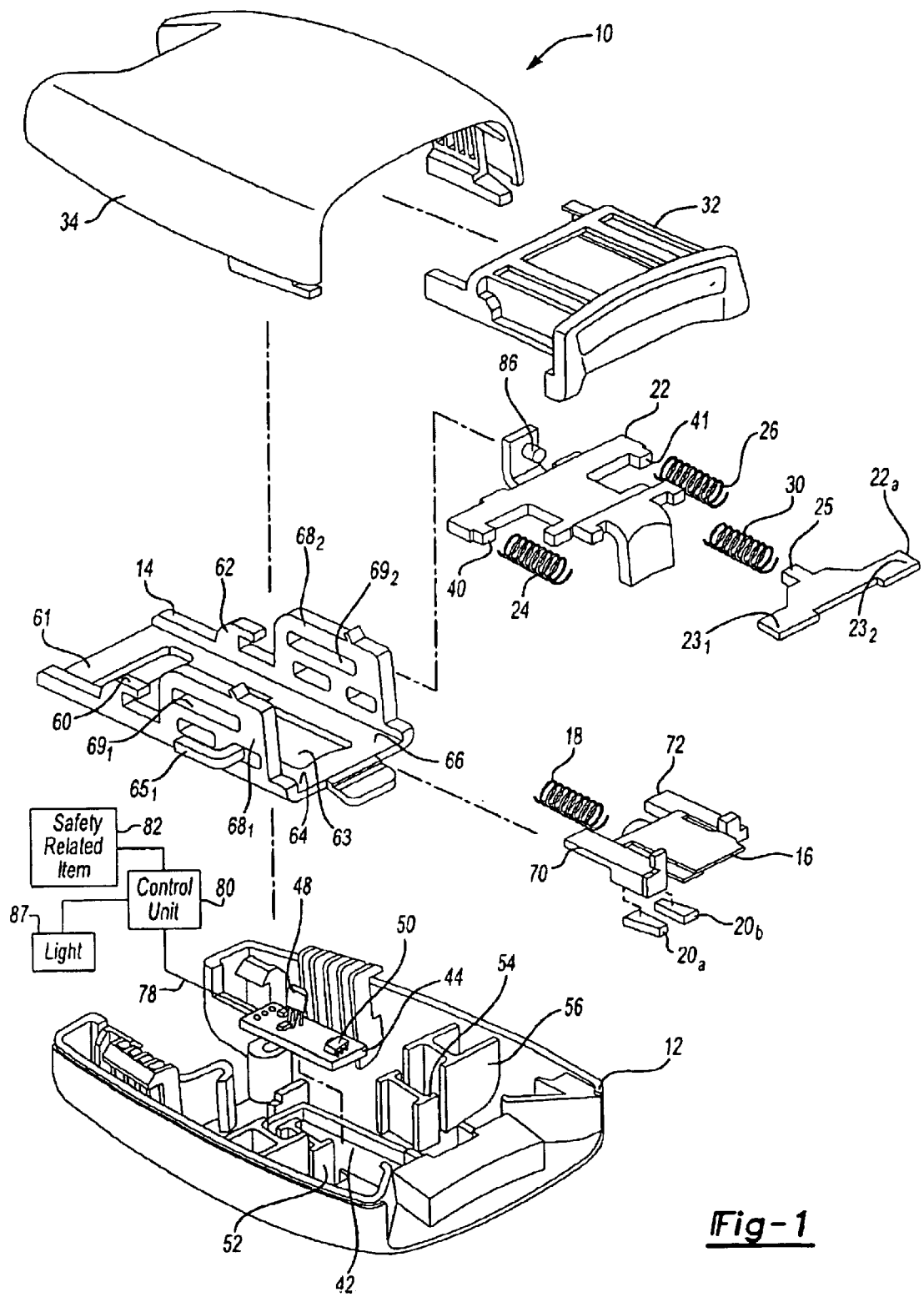
FIG. 1 is an assembly view of the seat belt tension sensor assembly used in accordance with the present invention.

Referring now to the drawings wherein like reference numerals are used to identify identical components, FIG. 1 an assembly view of the seat belt tension sensor assembly generally indicated by 10. The seat belt tension sensor assembly 10 includes a bottom cover 12, a buckle 14, a slider 16, spring 18, a pair of magnets 20a and 20b, hook portions 22 and 22a, biasing members 24 and 26, a spring 30, a release button 32 and an upper cover 34.

Bottom cover 12 and upper cover 34 form a housing, which may be constructed out of a lightweight, easily-molded material such as plastic. Bottom cover 12 includes cavity 42 configured in size and shape to receive a printed circuit board (PCB) 44. PCB 44 may be mounted in cavity 42, for example, as shown. Printed circuit board 44 includes a Hall effect device 48 or other sensor capable of detecting a magnetic field. Device 48 is arranged so that it protrudes generally in a normal direction outwardly from PCB 44. PCB 44 also includes a second sensor, such as a switch 50, configured to detect when a seat belt is engaged, as described in greater detail below. As illustrated, bottom cover 12 also includes I-beam like structures 52, 54, and 56 that retain buckle 14 when slider 16, hook 22,22a, spring 18 and biasing members 24 and 26 are assembled to buckle 14.

Figure 2:
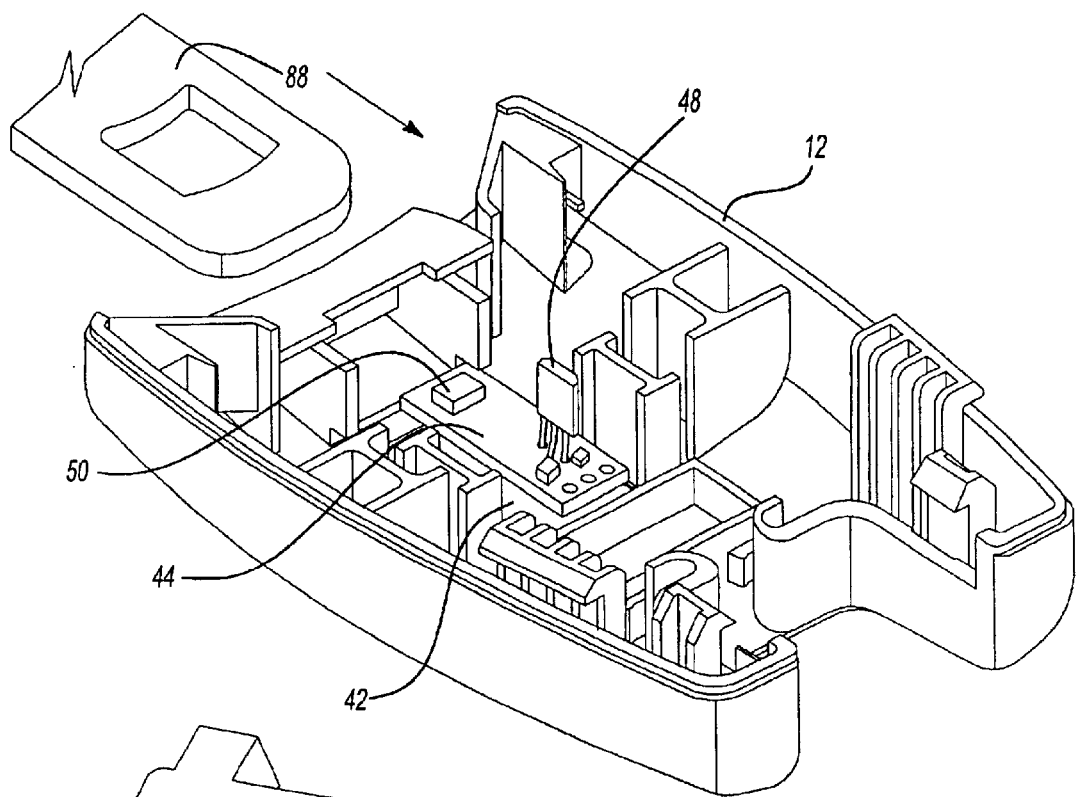
FIG. 2 is a simplified, perspective view of the seat belt sensor bottom cover in accordance with the present invention.

With reference to FIG. 2, a simplified, perspective view of the seat belt sensor bottom cover 12 is provided. Bottom cover 12 includes cavity 42 whereby a printed circuit board 44 is housed. Printed circuit board 44 is standard type that allows electrical components to be surface mounted. A Hall effect sensor 48 is mounted with three connections corresponding to power, ground and signal. Additionally, surface mounted switch or sensor 50 is used to detect a latching condition. Latch 88 is shown in the unlatched position. It should be understood that with reference to the orientation of PCB 44 as shown, is exemplary only and not limiting in nature. Many other orientations with respect to the placement of PCB 44 in the bottom cover 12 are achievable and are known to those of ordinary skill in the art and are consistent with the teachings of the present invention, which relate principally to the inventive arrangement. Nonetheless, the following may be taken as a non-limiting illustrated embodiment.

Referring again to FIG. 1, buckle 14 is generally rectangular shaped adapted to fit inside the housing and includes a generally planar base 61. Buckle 14 provides the means for receiving the assembly of slider 16 and hook portions 22, 22a. Buckle 14, as shown, also includes a pair of J-shaped extensions 60, 62. Buckle 14 also includes a centrally-disposed opening 63 defined in-part by a pair of opposing ledges 64 and 66. Opening 63 has a preselected lateral width, whose function will be described in greater detail below. Buckle 14 further includes a pair of side rails $68_1$ and $68_2$ extending generally normally from base 61, and having a preselected lateral width between inner surfaces thereof. Buckle 14 further includes elongated slots $69_1$ and $69_2$ which are formed into either side of side rails $68_1$ and $68_2$. The elongated slots $69_1$ and $69_2$ function to retain hook 22a which provides support for release button 32. When release button 32, in latched condition, is pushed, button 32 pushes hook 22a and allows hook 22a to spin up releasing latch 88.

FIG. 1 shows slider 16 from the top. Slider 16 is provided to carry a magnetic array responsive to engagement with and partial and full insertion of a seat belt tongue (best shown in FIG. 2). Slider 16 includes a pair of tabs 70, and 72. Slider 16 further includes cavities 74, 76 which are configured to receive magnets 20a and 20b, respectively, that define the magnetic array described above. The lateral (side-to-side) width of the cavities 74, 76 is selected to be no greater than the predetermined width of opening 63. This allows the cavities to be placed "down" into opening 63 of buckle 14 during assembly. Tabs 70, 72 have a side-to-side lateral width that is no greater than the preselected width between the side rails $68_1$, $68_2$. Through the foregoing, tabs 70, 72 can slide on top of ledges 64, 66.

Figure 3:
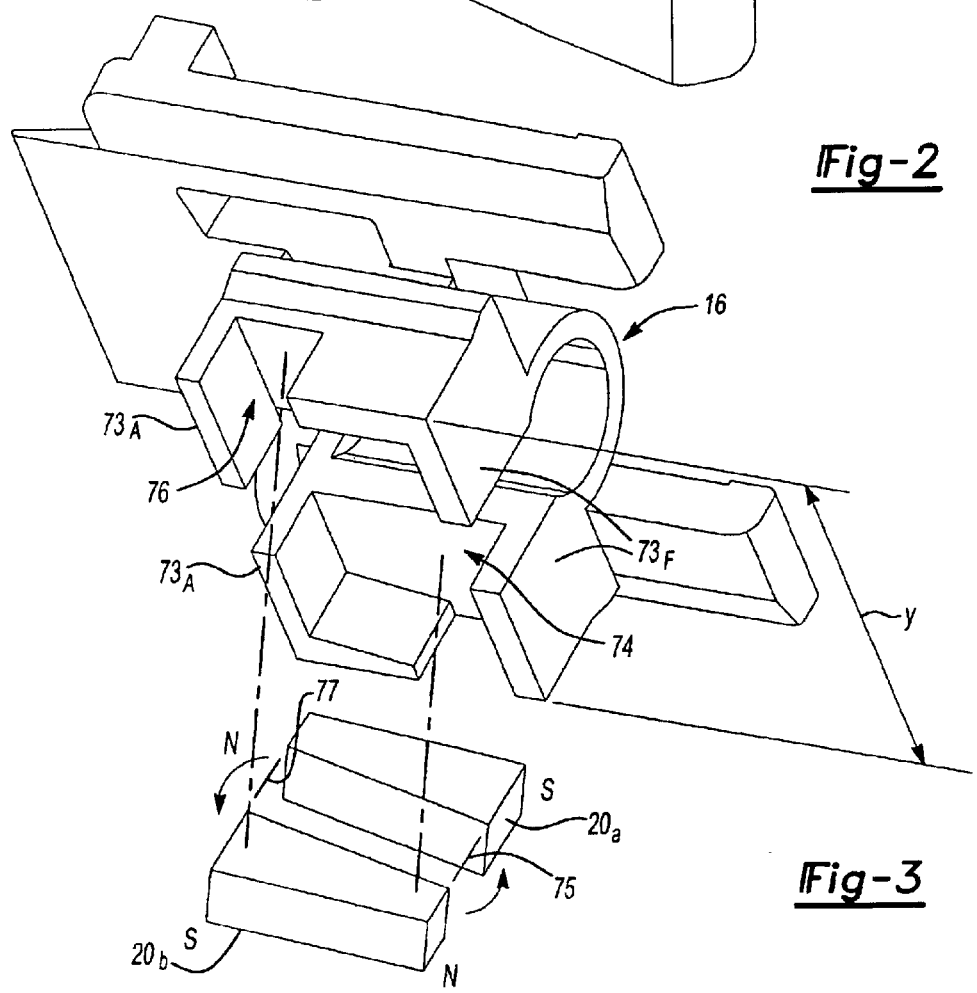
FIG. 3 is an exploded view of the slider and magnets in accordance with the present invention.

FIG. 3 is an exploded, bottom view of slider 16 and its accommodation of magnets 20a and 20b. Slider 16 comprises two cavities 74 and 76 that house magnets 20a and 20b respectively. Distance—γ—indicates the width of cavities 74 and 76 in order to fit through opening 63 of buckle 14. The forward and aft surfaces 73F and 73A respectively, of cavities 74, 76 cooperate with the forward and aft edges of opening 63 to provide mechanical stop features, thereby defining the longitudinal travel of slider 16. Magnets 20a and 20b are orientated side by side with opposite polarization (direction of magnetization on two parallel axis). In other words, magnets 20a and 20b are configured whereby the maximum magnetic field is created.

The design of cavities 74 and 76 provide that magnets 20a and 20b are orientated in a special array whereby a higher magnetic field intensity is created relative to the known art. More specifically, magnets 20a and 20b are placed side by side wherein the north side of magnet 20a is facing the south side of magnet 20b. The array of magnets 20a and 20b provide the maximum positive field at 75 and the maximum negative field at axis 77. In addition, the opposite orientation of the pair of magnets increases the magnetic field intensity thereby improving detection, and the accompanying signal-to-noise ratio. Moreover, the arrangement allows better use of the travel distance of the slider (i.e., the useful range over which tension sensing can occur).

The location of magnets 20a and 20b when assembled allow the Hall effect device 48 to protrude between magnets when slider 16 moves away from a first position (FIG. 4) where little or no tension is applied (since the tongue is unlatched) into one of a plurality of second positions (FIGS. 5–8). The second position(s) may correspond to tension levels between zero (latched but no tension), to increasing levels of tension as the seat belt is cinched. During travel of slider 16, the Hall effect device 48 remains stationary in the bottom cover 12. The Hall effect device 48 will sense the strength of the magnetic field of the approaching magnets 20a and 20b as the magnets travel toward the Hall effect device 48 and corresponding to the strength of the magnetic field, the Hall effect device 48 will determine the measurement of the tension, and will produce a signal that will determine whether or not to suppress any safety-related items 82 such as a hyper-tensioner, airbag, or pre-tensioner, etc. When the tension force as detected by the present invention exceeds the predetermined threshold, the system may be configured to suppress a passenger air bag.

In an exemplary embodiment, the Vcc of the Hall effect device 48 is 5 volts+/−0.5 volts DC. The voltage with no magnetic field present will be approximately 2.5 v. As the magnets are brought into the proximity of the hall effect device, the voltage will increase to near Vcc or decrease to near ground, depending on the polarity of the magnet. Accordingly, as the voltage increases or decreases, so does the tension of the seat belt. Of course, Vcc may have values greater than and less than 5 volts.

With continued reference to FIG. 1, J-shaped extensions 60 and 62 form slots that allow hook 22 to hinge and thereby allow movement of the hook 22 when a latch (not shown) of the seat belt is inserted into assembly 10. Biasing members 24 and 26 provide biasing force and are held into place by a pair of tabs 40 and 41 of hook 22 and a pair of hooks $65_1$ (only one is shown) located on either side of buckle 14. Biasing members 24 and 26 can be of either compression or tension type. Biasing members 24 and 26 provide the urging force that slider 16 must overcome in order to move from a first position to a second position (as described above).

In an exemplary embodiment, the biasing force of the members 24 and 26 is overcome when a force of 5 to 15 pounds is applied therefore causing slider 16 to move into the second position (FIGS. 5–8). Of course, and as such applications may require, the biasing force of members 24 and 26 to become overcome may vary. Accordingly, and when the urging force of members 24 and 26 are overcome, slider 16 travels towards the Hall effect device 48 and magnets 20a and 20b create a magnetic field around the Hall effect device 48 causing a resulting signal to be sent through a plurality of wires 78 and sent to the control unit 80.

FIG. 1 also shows hook 22a including wing like structures $23_1$ and $23_2$ which protrude out from elongated slots $69_1$ and $69_2$ (when assembled) and glide in a back and forth like manner when release button 32 is activated. Spring 30 is placed between hook 22a on tab 25 and stub 86 of hook 22 which allows movement of the release button 32.

Once release button 32 is in place, upper cover 34 snaps over bottom cover 12 and the integral seat belt sensor assembly is complete. Accordingly, the seat belt sensor assembly 10 is easily assembled.

Figure 4:
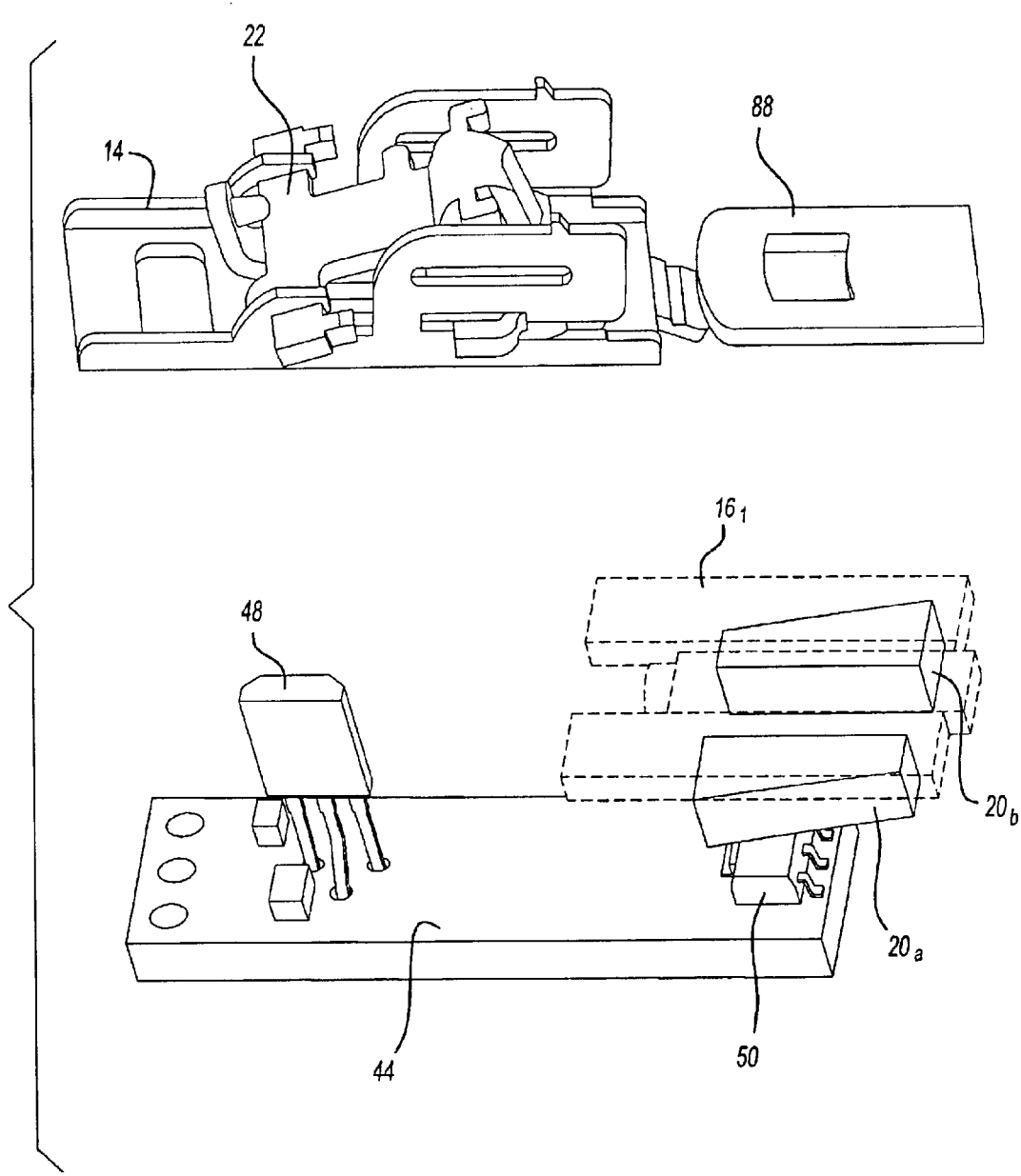
FIG. 4 is an exploded view of the seat belt sensor assembly in the unlatched position.

Referring now to FIG. 4, an exploded view of the seat belt sensor assembly 10 in an unlatched position is provided. When latch 88 is on the outside of sensor assembly, hook 22, hinged at buckle 14, is in the upright position as shown. The unlatched position allows slider 16, accommodating magnets 20a and 20b, to be urged into the first position through spring 18. When the slider is at the first position $16_1$, magnets 20a and 20b are located over switch 50 of PCB 44. Switch 50 is capable of reading the magnet field created by magnets 20a and 20b and registers a signal corresponding to the position. This signal may provide information to control unit 80 warning driver to latch seat belt via light 87 (FIG. 1), for example, when the vehicle is in use.

Figure 5:
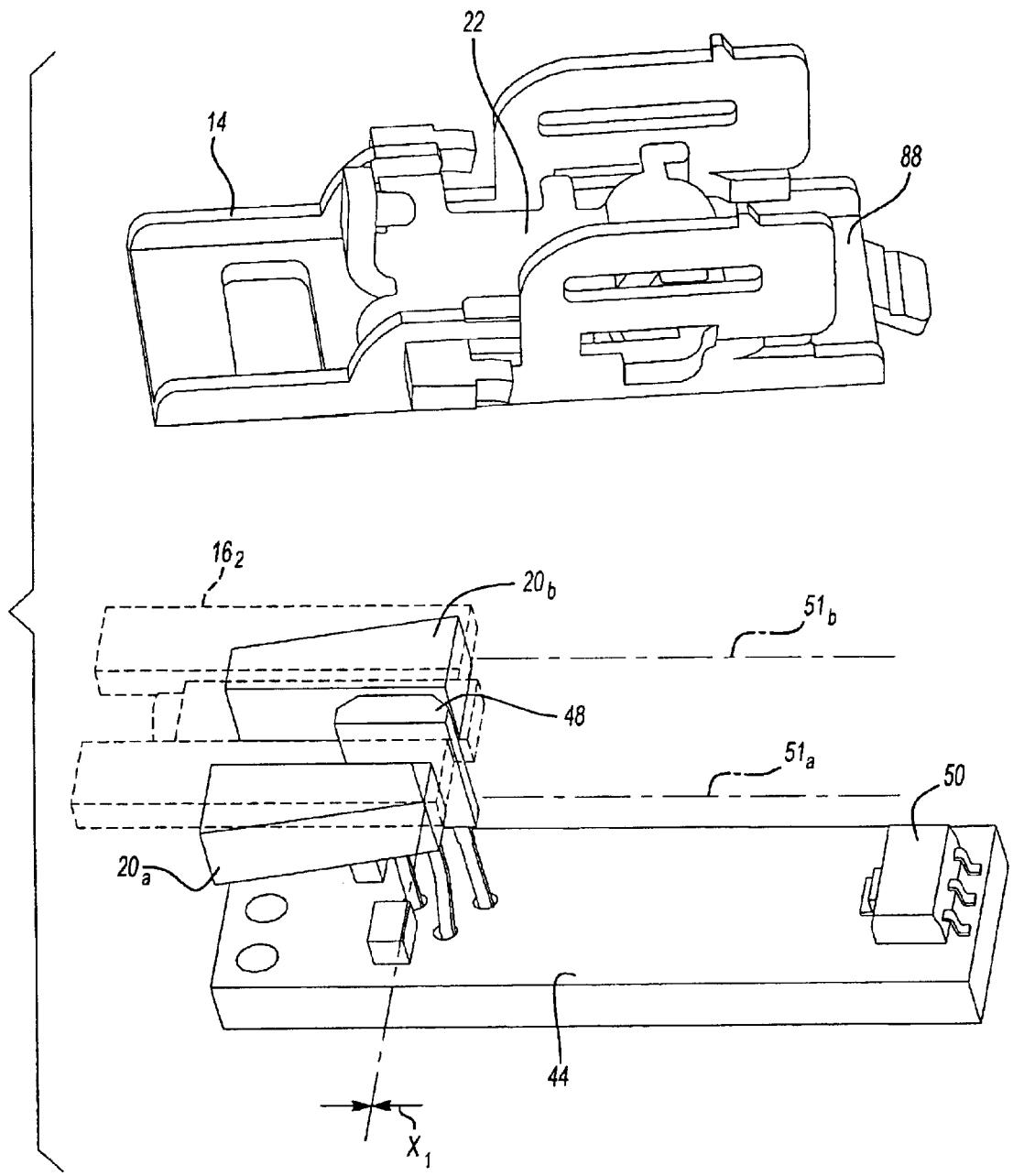
FIG. 5 is an exploded view of the seat belt sensor assembly in a first latched position with a first amount of tension applied, namely zero tension.
Figure 6:
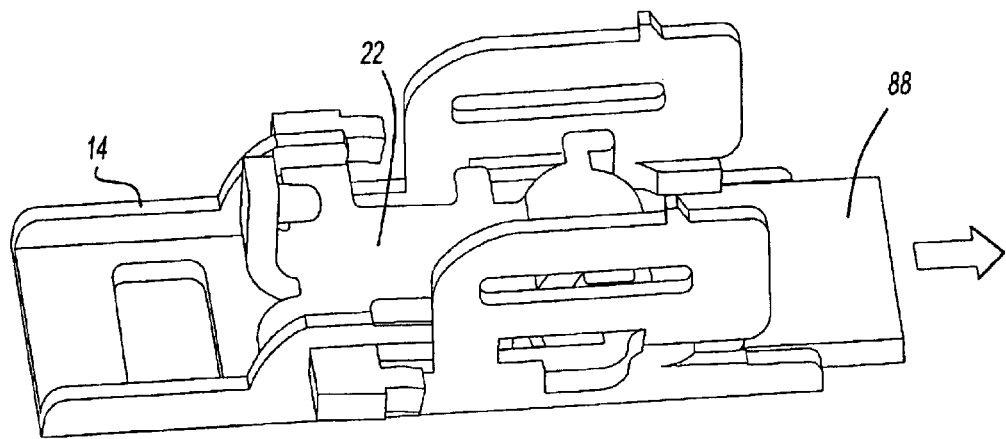
FIG. 6 is a view of the seat belt sensor assembly in a second latched position with a second amount of tension applied.
Figure 7:
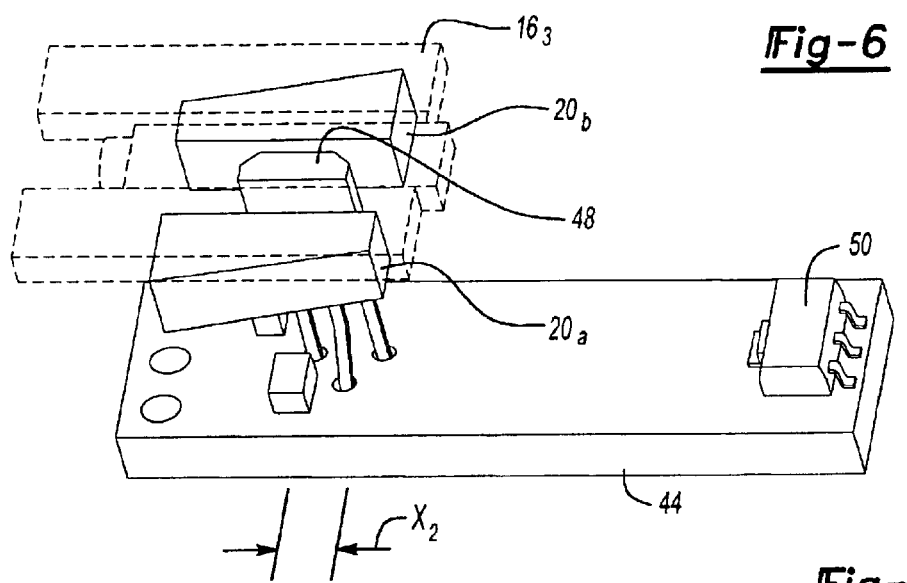
FIG. 7 an a view showing a Hall effect device and magnets in a position corresponding to the second latched position of FIG. 6.
Figure 8:
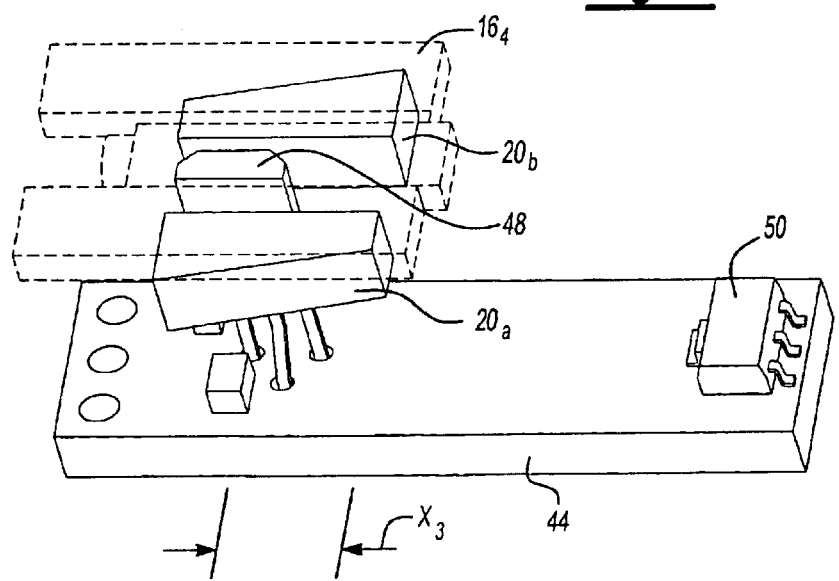
FIG. 8 is a view showing the magnets in a position corresponding to a third latched position and with a third amount of tension applied.

FIG. 5 represents an exploded view of the seat belt sensor assembly 10 in the latched position, with zero tension. When latch 88 is inside sensor assembly 10, hook 22 hinged at buckle 14 is in the closed position as shown in the upper part of FIG. 5. The latched position causes slider at a second position $16_2$ specifically the magnets 20a and 20b thereof, to be substantially aligned with sensor 48. Measurement $X_1$ is arbitrarily selected for purposes of illustration to place magnets 20a and 20b at a certain distance from the front edge of Hall effect device 48. This distance registers a certain magnetic field strength whereby Hall effect sensor 48 produces an output signal accordingly. Magnets 20a and 20b respectively travel along axes 51a and 51b. Axes 51a and 51b are offset one from another. The array of magnets 20a and 20b cooperate to provide a higher magnetic field intensity whereby the output signal is improved and the signal to noise ratio is improved. The magnetic array arrangement is also more efficient with respect to resolving varying tension levels inasmuch as it provides a higher percentage of effective use of travel compared to the total travel of the slider. This will be shown as FIGS. 6–8 are described, showing how changes in tension translate into an offset distance, which in turn changes the position of the sensor 48 in the magnetic field created by magnets 20a and 20b. Resulting changes in the detected field strength by sensor 48 will vary the output signal (e.g., a voltage level).

FIG. 6 shows tension is applied to the seat belt (not shown). Latch 88 moves in the direction of the arrow thereby creating a force necessary to move slider away from position $16_2$ toward position $16_3$.

FIG. 7 shows slider in position $16_3$. Distance $X_2$ places magnets 20a and 20b, residing in slider at position $16_3$, at a certain distance from the front edge of Hall effect device 48. This distance $X_2$ correspond to a certain tension applied via latch 88. The relative positions of sensor 48 and magnets 20a, 20b register a certain magnetic field strength whereby Hall effect sensor 48 produces an output signal that corresponds to the intensity of the magnetic field created by the location of magnets 20a and 20b.

If additional tension is applied, FIG. 8, distance $X_3$ places magnets 20a and 20b, residing in the slider at position $16_4$ at a distance defined by $X_3$ from the front edge of Hall effect device 48.

Many tension levels can be created when latch 88 is pulled and tightened, therefore measurements of $X_2$ and $X_3$ illustrate but a few of the plurality of possible tension measurements that may occur when operating the seat belt sensor tension assembly.

The magnets traverse a distance with respect to the tension applied to the slider. More specifically, if the magnets travel a total distance of 8 mm with the slider, approximately 7 mm of data is captured by the Hall effect device. Additionally, if the magnets travel 5 mm total with the slider, approximately 4 mm of data is captured by the Hall effect device. Therefore the distance of the travel as compared to the total travel of the slider is more effectively translated into useful information by the Hall effect device.

It will be understood that the above description is merely exemplary rather than limiting in nature, the invention being limited only by the appended claims. Various modifications and changes may be made thereto by one of ordinary skill in the art, which embody the principals of the invention and fall within the spirit and scope thereof.

What is claimed is:

1. A seat belt tension sensor assembly comprising:
   a housing;
   a slider slidably received within said housing, said slider being configured for movement between a first position and a second position within said housing;
   a first and second magnet associated with said slider for slidable movement therewith, said first and said second magnets being positioned side by side with opposite polarization;
   a hall effect device being fixed relative to said housing and protruding between said first and said second magnet when said slider is in said second position, said hall effect device being configured to produce an output voltage signal, said output voltage signal being indicative of a seat belt tension of a seat belt as applied to said sensor assembly; and
   a biasing member for providing an urging force to said slider, said urging force urging said slider into said first position, wherein said housing further comprises a hook to accept a latch of said seat belt.

2. The seat belt sensor assembly of claim 1 wherein said slider further comprises a mechanical stop feature.

3. The seat belt sensor assembly of claim 1 wherein said slider is adapted for receiving force from said latch.

4. The seat belt sensor assembly of claim 1 wherein said hall effect device produces a discrete signal.

5. The seat belt sensor assembly of claim 1 wherein said output voltage signal changes as a function of tension which causes the movement of said slider.

6. The seat belt sensor assembly of claim 1 wherein said biasing member is a plurality of springs.

7. A seat belt tension sensor assembly comprising:
   a housing;
   a slider slidably received within said housing, said slider being configured for movement between a first position and a second position within said housing;
   a first and second magnet associated with said slider for slidable movement therewith, said first and said second magnets being positioned side by side with opposite polarization;
   a hall effect device being fixed relative to said housing and protruding between said first and said second magnet when said slider is in said second position, said hall effect device being configured to produce an output voltage signal, said output voltage signal being indicative of a seat belt tension of a seat belt as applied to said sensor assembly, said first position of said slider corresponding to an unlatched position of said seat belt;

a biasing member for providing an urging force to said slider, said urging force urging said slider into said first position, said biasing member comprising at least a compression spring; and wherein said hall effect device provides said output voltage signal to a control unit, said control unit configured to control a safety-related item based on said output voltage signal indicative of seat belt tension, said assembly further comprising a switch fixed relative to said housing configured to detect a magnetic field created by said first and second magnets when said slider is in said first position.

8. The seat belt tension sensor assembly of claim 7 wherein said control unit is configured to operate a light display when said slider is in said first position.

9. The seat belt tension sensor assembly of claim 7 wherein said safety-related item is an airbag.

10. The seat belt tension sensor assembly of claim 7 wherein said safety-related item is a pre-tensioner.

11. A seat belt tension sensor assembly comprising:

a housing;

a slider slidably received within said housing, said slider being configured for movement between a first position and a second position within said housing;

a first and second magnet associated with said slider for slidable movement therewith, said first and said second magnets being positioned side by side with opposite polarization;

a hall effect device being fixed relative to said housing and protruding between said first and said second magnet when said slider is in said second position, said hall effect device being configured to produce an output voltage signal, said output voltage signal being indicative of a seat belt tension of a seat belt as applied to said sensor assembly;

a biasing member for providing an urging force to said slider, said urging force urging said slider into said first position;

wherein said hall effect device provides said output voltage signal to a control unit, said control unit configured to control a safety related item based on said output voltage signal indicative of seat belt tension; and a switch being fixed relative to said housing configured to detect a magnetic field created from said first and said second magnet when said slider is in said first position.

12. The seat belt tension sensor assembly of claim 11 wherein said housing further comprises a hook to accept a latch of said seat belt.

13. The seat belt tension sensor assembly of claim 12 wherein said slider is adapted for receiving force from said latch.

14. The seat belt tension sensor assembly of claim 13 wherein said switch reacts relative to a position of said latch.

15. The seat belt tension sensor assembly of claim 12 wherein said first position of said slider corresponds to an unlatched position of said seat belt.

* * * * *